(12) United States Patent
Chhabra et al.

(10) Patent No.: US 10,691,627 B2
(45) Date of Patent: Jun. 23, 2020

(54) AVOIDING REDUNDANT MEMORY ENCRYPTION IN A CRYPTOGRAPHIC PROTECTION SYSTEM

(71) Applicant: Intel Corporation, Santa Clara, CA (US)

(72) Inventors: Siddhartha Chhabra, Hillsboro, OR (US); David M. Durham, Beaverton, OR (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 15/089,280

(22) Filed: Apr. 1, 2016

(65) Prior Publication Data
US 2017/0286320 A1  Oct. 5, 2017

(51) Int. Cl.
*G06F 12/14*     (2006.01)
*G06F 13/28*     (2006.01)

(52) U.S. Cl.
CPC ............ *G06F 13/28* (2013.01); *G06F 12/145* (2013.01); *G06F 2212/1052* (2013.01)

(58) Field of Classification Search
CPC . G06F 13/28; G06F 12/145; G06F 2212/1052
USPC ......................................................... 713/193
See application file for complete search history.

(56) References Cited

U.S. PATENT DOCUMENTS

| 8,819,455 B2* | 8/2014 | Chhabra | G06F 21/71 713/193 |
| 2009/0031142 A1* | 1/2009 | Halevi | G06F 12/1408 713/190 |
| 2010/0031370 A1* | 2/2010 | Ellison | G06F 21/57 726/27 |
| 2017/0010982 A1* | 1/2017 | Avanzi | G06F 12/1408 |
| 2017/0177457 A1* | 6/2017 | Swanson | G06F 1/24 |
| 2017/0286320 A1* | 10/2017 | Chhabra | G06F 12/1408 |

* cited by examiner

*Primary Examiner* — Farid Homayounmehr
*Assistant Examiner* — Sanchit K Sarker
(74) *Attorney, Agent, or Firm* — Grossman, Tucker, Perreault & Pfleger, PLLC (57) ABSTRACT

This disclosure is directed to avoiding redundant memory encryption in a cryptographic protection system. Data stored in a device may be protected using different encryption systems. Data associated with at least one trusted execution environment (TEE) may be encrypted using a first encryption system. Main memory in the device may comprise data important to maintaining the integrity of an operating system (OS), etc. and may be encrypted using a second encryption system. Data may also be placed into a memory location via direct memory access (DMA) and may be protected utilizing a third encryption system. Redundant encryption may be avoided by encryption circuitry capable of determining when data is already protected by encryption provided by another system. For example, the encryption circuitry may comprise encryption control circuitry that monitors indicators set at different points during data handling, and may bypass certain data encryption or decryption operations based on the indicator settings.

22 Claims, 6 Drawing Sheets

AVOIDING REDUNDANT MEMORY ENCRYPTION IN A CRYPTOGRAPHIC PROTECTION SYSTEM

TECHNICAL FIELD

The present disclosure relates to device security, and more particularly, to a system for implementing different types of encryption in a memory while avoiding redundant encryption.

BACKGROUND

Electronic data security has become an area of great focus for development as more daily transactions become computerized. Computing devices are constantly being utilized to exchange financial data, personal identification data, etc. As a result, hackers may attempt to compromise computing devices to gain access to this valuable information. For example, malicious software (e.g., malware) may be loaded to passively or actively attack computing devices. Passive attacks may comprise malware observing data being passed between a processor and a memory to obtain passwords or other sensitive or confidential data. Active attacks may involve altering data stored in memory to trigger an atypical result such as allowing an unpermitted user to gain access to the computing device. In either instance, plaintext (unencrypted) data in the memory of a computing device, that is exchanged with a processor in the computing device, etc. is a major vulnerability.

Virtualized computing environments may offer some inherent protection from the above attacks. For example, a virtualized device may comprise at least one virtual machine (VM). The VM is a software-based execution environment that emulates actual device hardware. Each VM may emulate multiple physical devices within a single device. An example implementation may include a virtual machine manager (VMM) or "hypervisor" to control at least one "trusted" VM or trusted execution environment (TEE) and at least one untrusted VM. The TEE may provide a protected environment in which software may execute without being exposed to potential attacks from malicious software (malware), etc. While a TEE may offer strong protection, it may not be feasible to execute operational software for an entire device from within the TEE. This exposes other potential points of attack (e.g., attack vectors) that make up an attack surface for the device. Hardware and software developers seek to better protect devices by reducing the attack surface. One manner in which this may be accomplished is by encrypting more of the data in the device, possibly using different encryption systems. However, encrypting a piece of data utilizing more than one encryption system may generate processing overhead that impacts device performance.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to avoiding redundant memory encryption in a cryptographic protection system. A device, or devices, may comprise data protected utilizing a combination of different encryption systems. For example, data associated with at least one TEE in the device may be encrypted utilizing a first encryption system. Main memory in the device may comprise data important to maintaining the integrity of an operating system (OS) and other data important for protecting applications, drivers, utilities, etc. The data in the main memory may be encrypted utilizing a second encryption system. Data may also be placed into a memory location via direct memory access (DMA). In DMA data is typically routed directly from a source of the data (e.g., an I/O device) to the memory location without being handled by processing circuitry, which may expedite data processing and overall device performance. DMA data may be protected utilizing a third encryption system. Consistent with the present disclosure, redundant encryption may be avoided by encryption circuitry capable of at least determining when data is already protected by an encryption provided by another system. For example, the encryption circuitry may comprise encryption control circuitry that monitors indicators set at different points during data handling, and may bypass certain data encryption or decryption operations based on the indicator settings.

In at least one embodiment, a device equipped for cryptographic memory protection may comprise, for example, at least memory circuitry to store data and processing circuitry to process the data stored in the memory circuitry. The memory circuitry may include, for example, a first region in which encrypted data associated with at least one TEE is stored, a second region in which encrypted data associated with general memory is stored and at least one memory location in which encrypted data received via DMA is stored. The processing circuitry may include, for example, encryption circuitry to avoid redundant memory encryption by controlling at least one of a first encryption engine to perform data encryption and decryption for the first region or a second encryption engine to perform data encryption and decryption for the second region.

In at least one embodiment, the processing circuitry may be based on Secure Guard Extensions (SGX) technology and the encryption circuitry may include a memory encryption engine (MEE). The first region may correspond to a first fixed range of memory addresses and the second region may correspond to a second fixed range of memory addresses. The device may further comprise I/O circuitry to receive or generate I/O data and store the I/O data in the memory circuitry via DMA.

In at least one embodiment, the device may further comprise a third encryption engine to perform at least data encryption for the at least one memory location. The third encryption engine may be to set a protection indicator bit indicating that data received via DMA has been encrypted. The processing circuitry may be to cause an operating system (OS) in the device to set a secure I/O indicator bit associated with the at least one memory location, the secure I/O indicator bit indicating that the at least one memory location is a secure memory location. The processing circuitry may further comprise a translation lookaside buffer (TLB), and the processing circuitry may be to load a translation and the secure I/O indicator bit into the TLB.

In at least one embodiment, the encryption circuitry may comprise at least encryption control circuitry, the first encryption engine and the second encryption engine. In an example implementation the encryption circuitry may also comprise the third encryption engine. The encryption control circuitry may be to control data encryption and decryption involving at least the second encryption engine based on a setting of at least one of the protection indicator bit and the secure I/O indicator bit. Consistent with the present disclosure, an example method for cryptographic memory protection may comprise receiving an access request at processing circuitry in a device to access a memory location in memory circuitry in the device, the memory circuitry including a first region in which encrypted data associated with at least one TEE is stored, a second region in which encrypted data associated with general memory is stored and at least one memory location in which encrypted data received via DMA is stored, determining, in encryption circuitry within the processing circuitry, the setting of at least one indicator bit corresponding to the data or the memory location and avoiding redundant memory encryption by controlling, in the encryption circuitry, at least one of a first encryption engine in the encryption circuitry to perform data encryption and decryption for the first region or a second encryption engine to perform data encryption and decryption for the second region of the memory circuitry.

Figure 1:
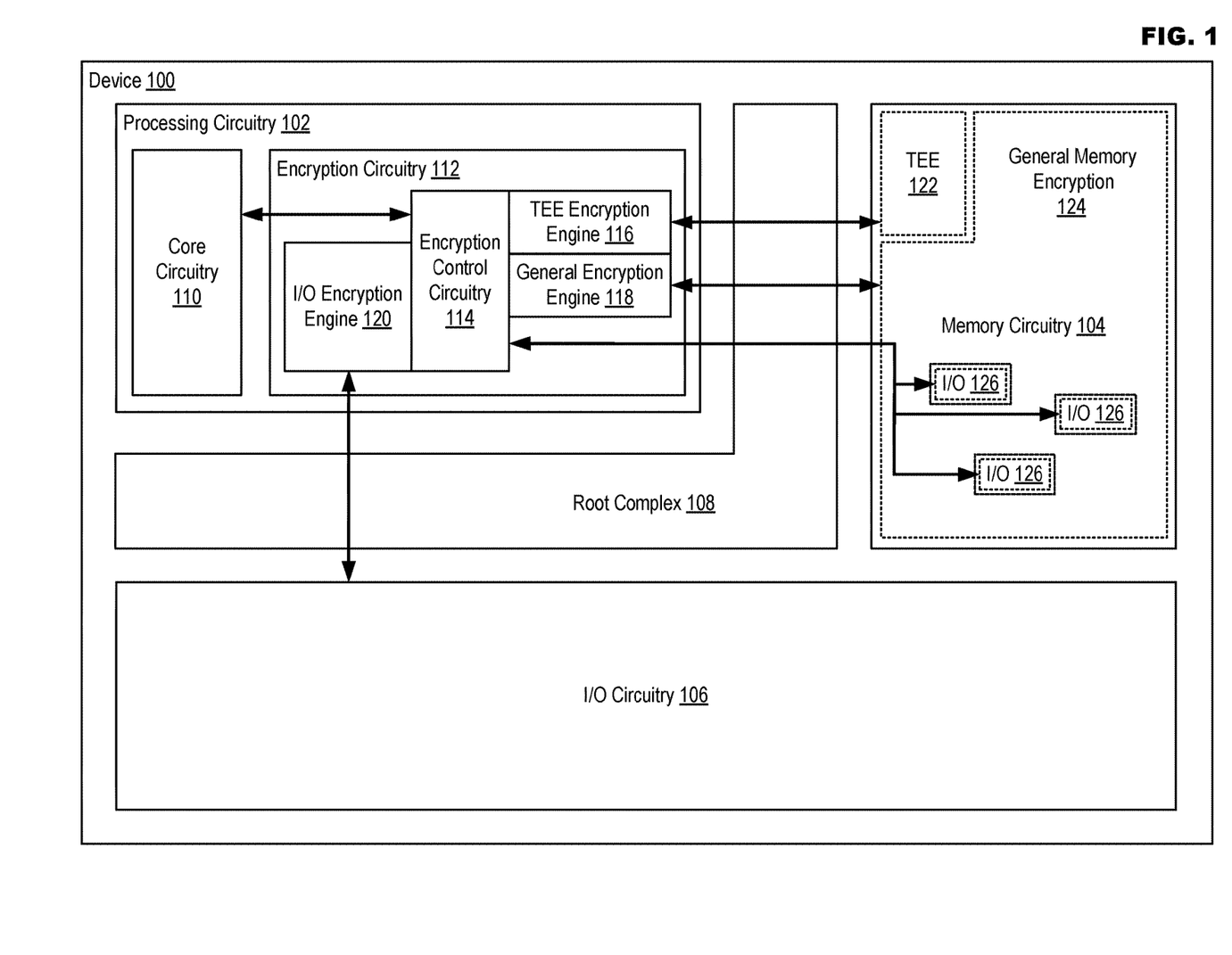
FIG. 1 illustrates an example of a device equipped to avoid redundant memory encryption in a cryptographic protection system in accordance with at least one embodiment of the present disclosure.

FIG. 1 illustrates an example of a device equipped to avoid redundant memory encryption in a cryptographic protection system in accordance with at least one embodiment of the present disclosure. Embodiments consistent with the present disclosure may make reference to various technologies such as, for example, SGX and DMA from the Intel Corporation, components that make up SGX and DMA, the manner in which SGX and DMA operate, etc. These technologies have been employed herein to provide a readily comprehensible perspective for understanding the various disclosed embodiments, and are not intended to limit implementations to employing only SGX and DMA. Moreover, the inclusion of an apostrophe after an item number (e.g., 100') in drawing figure within the present disclosure may indicate that an example embodiment of the particular item is being illustrated. The examples are shown merely for the sake of explanation.

As referenced herein "cryptographic protection" may generally comprise protecting the confidentiality of data stored within a memory location or range of memory range by encrypting the data stored in the memory location or range, and controlling access to the data by managing access to at least one cryptographic key for use in encrypting/decrypting data read from/written to the memory range. The terms "VMM" and "hypervisor" may be used interchangeably herein in reference to a virtual machine manager. Acronyms used herein but inadvertently not defined are respectfully asserted to be readily determinable in view of the disclosure, figures and/or what is known in the art. DMA is a technology that may allow certain equipment within a device to directly access memory in the device independently of the processing circuitry in the device. At least one example presented herein involves I/O equipment such as user input devices, NICs, etc. placing data directly into physical memory (e.g., RAM) within a device. While some properly-enabled I/O equipment may be able to write I/O data directly to physical memory utilizing DMA, I/O equipment is just one example of hardware that may be able to perform DMA. The various embodiments disclosed herein are not limited to implementation only utilizing I/O equipment.

An example configuration for device 100 is disclosed in FIG. 1. Device 100 may be any apparatus equipped with computing resources (e.g., resources for processing data). While device 100 has been illustrated as contiguous in FIG. 1, device 100 may actually be made up of separate devices (e.g., coupled via wired or wireless communication). The devices making up device 100 may be configured to operate collaboratively such as, for example, in the instance of a desktop computer that may include a central processing unit (CPU) that is coupled to a separate monitor, peripheral devices, etc., a server rack comprising a plurality of data servers, etc. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen OS™ from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, server, a group of computing devices in a high performance computing (HPC) architecture, a smart television or other "smart" device, small form factor computing solutions (e.g., for space-limited applications, TV set-top boxes, etc.) like the Next Unit of Computing (NUC) platform from the Intel Corporation, etc.

Device 100 may comprise, for example, processing circuitry 102, memory circuitry 104, I/O circuitry 106 and root complex 108. In general operation, processing circuitry 102 may, for example, perform various activities that manipulate the data stored in memory circuitry 104. I/O circuitry may generate data (e.g., from user interaction) or may receive data (e.g., from a network source) to store in memory 104 via DMA and/or access data in memory circuitry 104 via DMA (e.g., for presentation to a user). Root complex 108 may comprise circuitry to control how data is conveyed on the bus or buses that couple processing circuitry 102, memory circuitry 104 and I/O circuitry 106. For example, in a Peripheral Component Interconnect Express (PCIe) system, root complex 108 may include at least one port and a switch fabric made up of switch devices to generate transaction requests for processing circuitry 102.

Processing circuitry 102 may comprise core circuitry 110 and encryption circuitry 112. Core circuitry 110 may comprise at least one processing core to process data stored in memory circuitry 104. Encryption circuitry may generally be configured to encrypt plaintext data (e.g., unencrypted data) prior to storage in memory circuitry 104, and to decrypt encrypted data prior to the data being processed by core circuitry 110, the data being DMA'd to another location in device, 100, etc. Consistent with the present disclosure, encryption circuitry 112 may comprise at least encryption control circuitry 114 and encryption engines corresponding to each encryption system being employed in device 100. For example, encryption circuitry 112 may comprise at least TEE encryption engine 116, general encryption engine 118 and I/O encryption engine 120. In general, encryption control circuitry 114 may control the data flowing from core circuitry 110 and I/O circuitry 106 to memory circuitry 104, and vice versa. When performing this function, encryption control circuitry may route data to be stored in memory circuitry 104 through one of TEE encryption engine 116 or general encryption engine 118, as appropriate, to be encrypted prior to storage in memory circuitry 104, or may cause both of encryption engines 116 and 118 to be skipped when the data has already been encrypted by I/O encryption engine 120. In this manner, encryption control circuitry may ensure that redundant encryption is avoided. Further details as to how these operations may be performed are disclosed below regarding FIGS. 2 to 7.

Consistent with the present disclosure, different regions of memory circuitry 104 may be protected by encryption to protect against unauthorized access. Device 100 may encrypt a region of memory for use only by at least one TEE 122 using a first system of protection. For example, SGX may be used to protect TEE region 122. SGX may provide a secure, hardware-encrypted computation and storage area within system memory, the contents of which cannot be deciphered by privileged code, by applying hardware probes to memory bus, etc. When TEE region 122 is protected by SGX it becomes impossible for an intruder to read the contents of the secure area. Protected data cannot be observed outside of SGX, making it inaccessible outside of SGX. SGX includes functionality wherein data identifying a "trusted" program (e.g., based at least in part on a cryptographic hash measurement of the program's contents) may be signed and stored inside the program. When the trusted program is loaded, processing circuitry 102 may verify that a current measurement of the trusted program is identical to a measurement previously embedded inside the program. The signature used to sign the embedded measurement is also verifiable by processing circuitry 102 through a public key that may be used to verify the signature at program load time. Malware cannot tamper with a protected program because its measurement would also be altered. Malware also cannot spoof the signature because the signing key may be secured with the program's author. Equipment, software, etc. will be described below that may be usable to implement security technology like SGX in device 100. However, consistent with the present disclosure, other security technologies existing now or developed in the future may also be used.

In addition to protection systems like SGX, general memory encryption 124 may provide protection at runtime for lower privilege software like an OS, applications, utilities, drivers, etc. For example, there is some interest amongst software developers for a system that provides total memory encryption (TME). TME may encrypt the entire main memory (e.g., physical memory) of device 100. General memory encryption 124 may protect against lost or stolen systems (e.g., wherein an attacker has physical access to the system) being compromised. In this scenario, an attacker may be able to retrieve sensitive user information including, for example, keys used for disk encryption.

DMA from/to I/O devices may comprise an input flow and an output flow. An example input flow may begin with an application that requests input data (e.g., an application requesting a password for user login). A device driver associated with an I/O device (e.g., a keyboard) may then allocate DMA memory and program a DMA controller in the device to send the data to that memory location. The data from the I/O device (e.g., a password entered on the keyboard by the user) may be written to memory in a kernel DMA buffer. Once data is available in the kernel DMA buffer, the DMA controller may raise an interrupt that is handled by the device driver to know that data is available. The data is then read by the device driver from the kernel buffer and copied to the application memory. The application may then process the input (e.g., verify the user password). In an example output flow the operations may be reversed. For example, the application may generate data (e.g., images) that is then sent to an output device (e.g., a display).

Security in device 100 may be strengthened through providing "trusted I/O" from I/O circuitry 106. Encrypting I/O data stored in memory as shown at 126 may prevent an attacker gaining access to I/O data such as, for example, passwords, codes, account numbers, etc. entered by a user, and may further prevent an attacker from altering I/O data already residing in memory circuitry 104. In this manner, "end-to-end" security may be provided. End-to-end security may be realized in that-device essential operation may be protected by a first system of encryption in TEE 122, OS and related software resources may be protected by a second system of protection in general memory encryption 124, and I/O may be secured through a third system that encrypts DMA data as shown at 126. While three systems of encryption are disclosed herein, more or less systems of encryption may be implemented depending on, for example, the use for which device 100 is intended, the capabilities of device 100, the equipment/software within device 100, etc.

However, the comprehensive data protection afforded by utilizing multiple encryption systems may not be deemed beneficial without maintaining an acceptable level of performance in device 100. While performance may be maintained by avoiding the redundant encryption, implementing such as system is not straightforward. TEE 122 and general memory encryption 124 may use ranges of memory in memory circuitry 104 that are fixed, so double encryption may be avoided by controlling encryption based on where a memory address targeted in a read/write request falls within the memory ranges. For example, in a system implementing SGX a memory encryption engine (MEE) (e.g., corresponding to encryption circuitry 112) may maintain a fixed range of memory for TEE 122 indicated in processor reserved memory range register (PRMRR). General encryption engine 118 may then avoid redundant encryption by skipping encryption for any memory address that falls in the range of memory set in the PRMRR. The response path in SGX may be treated similarly. For example, the response tag may indicate that the response is for an MEE request, and general encryption engine 118 may bypass decrypting it. Similar logic cannot be applied to DMA traffic as memory locations for DMA are not allocated by the OS in any fixed range that may allow general encryption engine 118 to skip encryption/decryption.

Moreover, in TEE 122 and/or general memory encryption 124 the encryption of data is transparent to the application that owns the data. However, protection for DMA data is visible to the software. For example, I/O encryption engine 120 may encrypt I/O data that is received from a trusted application before storing it in memory circuitry 104. However, the data may also need to be decrypted by trusted software (e.g., in TEE 122) to recover the original device data. Hence a solution that exploits accesses originating from devices to skip general encryption engine 118 does not work. In addition, not all DMA traffic will be protected by trusted I/O to allow general encryption engine 118 to skip encryption of data originating from root complex 108. Again, with the software being aware of DMA protection there is no direct way to bypass general encryption engine 118.

In at least one embodiment, encryption control circuitry 114 may be employed to avoid the above problems. Encryption control circuitry 114 may monitor various indicators that are set in various locations to learn the origin of data and/or the encryption system that was employed to encrypt the data. Encryption control circuitry 114 may then determine the particular encryption engine to employ based on the indicators, and thus avoid redundant encryption. In at least one embodiment, the indicators may be bits associated with a memory location where data is stored, the transaction and/or in an interface register between I/O encryption engine 120 and encryption control circuitry 114. For example, I/O encryption engine 120 may encrypt incoming I/O data and may set a protection indicator bit indicating that the I/O data has been encrypted. Encryption control circuitry 114 may receive the I/O data from I/O encryption engine 120. When encryption control circuitry 114 determines that the protection indicator bit is set, encryption of the I/O data by general encryption engine 118 may be skipped. In at least one embodiment, a DMA driver (e.g., software to facilitate DMA in device 100) may further request that the OS in the device 100 set a secure I/O indicator bit (e.g., in a page table loaded to a translation lookaside buffer in processing circuitry 102) indicating that the memory location is secure memory. The secure I/O indicator bit may then be looked up when I/O memory locations such shown at 126 are accessed so that encryption control circuitry 114 may skip unnecessary duplicative decryption when the I/O data is read. In particular, encryption control circuitry 114 may determine that the data was originally encrypted by I/O encryption engine 120 based on the secure I/O indicator bit being set, and thus may skip decryption via general encryption engine 118.

Figure 2:
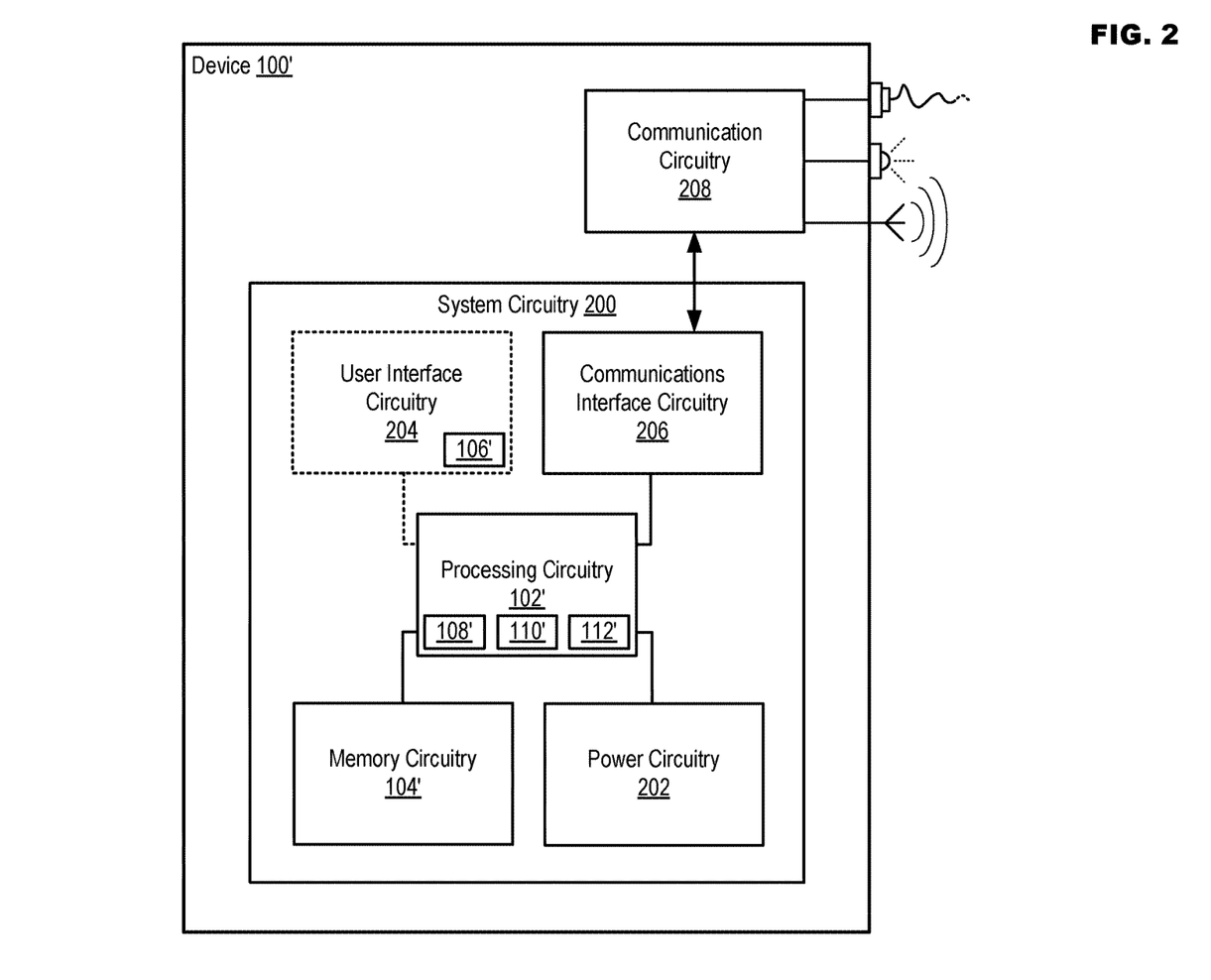
FIG. 2 illustrates an example configuration for a device usable in accordance with at least one embodiment of the present disclosure.

FIG. 2 illustrates an example configuration for a device usable in accordance with at least one embodiment of the present disclosure. Device 100' may be capable of performing any of the activities described above with respect to FIG. 1. However, device 100' is presented only as an example of an apparatus usable in embodiments consistent with the present disclosure, and is not intended to limit any of the various embodiments to any particular manner of implementation.

Device 100' may comprise system circuitry 200 to manage device operations. System circuitry 200 may include, for example, processing circuitry 102', memory circuitry 104', power circuitry 202, user interface circuitry 204 and communication interface circuitry 206. Device 100' may further include communication circuitry 208. While communication circuitry 208 is illustrated as separate from system circuitry 200, the example configuration shown in FIG. 2 has been provided merely for the sake of explanation. Some or all of the functionality associated with communication circuitry 208 may also be incorporated into system circuitry 200.

In device 100', processing circuitry 102' may comprise one or more processors situated in separate components, or alternatively one or more processing cores (e.g., core circuitry 110') in a single component (e.g., in a system-on-a-chip (SoC)), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing circuitry 102' may interact with other system components that may be operating at different speeds, on different buses, etc. in device 100'. Moreover, some or all of the functionality commonly associated with the support circuitry may also be included in the same physical package as the processor (e.g., such as in the Sandy Bridge, Broadwell and Skylake families of processors available from the Intel Corporation).

Processing circuitry 102' may be configured to execute various instructions in device 100'. Instructions may include program code configured to cause processing circuitry 102' to perform activities related to reading data, writing data, processing data, formulating data, converting data, transforming data, etc. Information (e.g., instructions, data, etc.) may be stored in memory circuitry 104'. Memory circuitry 104' may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory circuitry configured based on BIOS, UEFI, etc. to provide instructions when device 100' is activated, programmable memories such as electronic programmable ROMs (EPROMS), Flash, etc. Other fixed/removable memory may include, but are not limited to, example magnetic memories such as hard disk (HD) drives, etc., example electronic memories such as solid state flash memory (e.g., embedded multimedia card (eMMC), etc.), removable memory cards or sticks (e.g., micro storage device (uSD), USB, etc.), example optical memories such as compact disc-based ROM (CD-ROM), Digital Video Disks (DVD), Blu-Ray Disks, etc.

Power circuitry 202 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 204 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 204 may be incorporated within device 100' and/or may be coupled to device 100' via a wired or wireless communication medium. User interface circuitry 204 may be optional in certain circumstances such as, for example, a situation wherein device 100' is a server (e.g., rack server, blade server, etc.) that does not include user interface circuitry 204, and instead relies on another device (e.g., a management terminal) for user interface functionality.

Communication interface circuitry 206 may be configured to manage packet routing and other control functions for communication circuitry 208, which may be configured to support wired and/or wireless communications. In some instances, device 100' may comprise more than one set of communication circuitry 208 (e.g., including separate physical interface circuitry for wired protocols and/or wireless radios) managed by communication interface circuitry 206. Wired communications may include serial and parallel wired mediums such as, for example, Ethernet, USB, FireWire®, Thunderbolt™, Digital Video Interface (DVI), High-Definition Multimedia Interface (HDMI), DisplayPort™, etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth®, WLAN, Wi-Fi, etc.), long range wireless mediums (e.g., cellular wide-area radio communication technology, satellite-based communications, etc.), electronic communications via sound waves, long-range optical communications, etc. In one embodiment, communication interface circuitry 206 may be configured to prevent wireless communications that are active in communication circuitry 208 from interfering with each other. In performing this function, communication interface circuitry 206 may schedule activities for communication circuitry 208 based on, for example, the relative priority of messages awaiting transmission. While the embodiment disclosed in FIG. 2 illustrates communication interface circuitry 206 being separate from communication circuitry 208, it may also be possible for the functionality of communication interface circuitry 206 and communication circuitry 208 to be incorporated into the same circuitry.

The various examples of circuitry described in conjunction with different embodiments of the present disclosure may comprise hardware, or combinations of hardware and software in which, for example, the software may be implemented by the hardware to then configure certain functionality in the hardware, configure the hardware to perform one or more specific operations, configure other hardware, etc. For example, at least a portion root complex 108', core circuitry 110' and encryption circuitry 112' may reside in processing circuitry 102'. Root complex 108', core circuitry 110' and encryption circuitry 112' may comprise only hardware or a combination of hardware and software. For example, program code for root complex 108', core circuitry 110' and/or encryption circuitry 112' may be stored in NV memory within memory circuitry 104'. The program code may then be used to load any or all of root complex 108', core circuitry 110' and encryption circuitry 112' into volatile memory (e.g., RAM) during operation of device 100'. For example, processing circuitry 102' may execute the program code to transform processing circuitry 102' from a general purpose data processing circuitry (e.g., a microprocessor) into specialized circuitry to perform various operations such as described herein. Root complex 108' may then handle transaction requests generated by core circuitry 110', and some or all of the data involved in the transaction requests may be encrypted or decrypted by encryption circuitry 112'.

Figure 3:
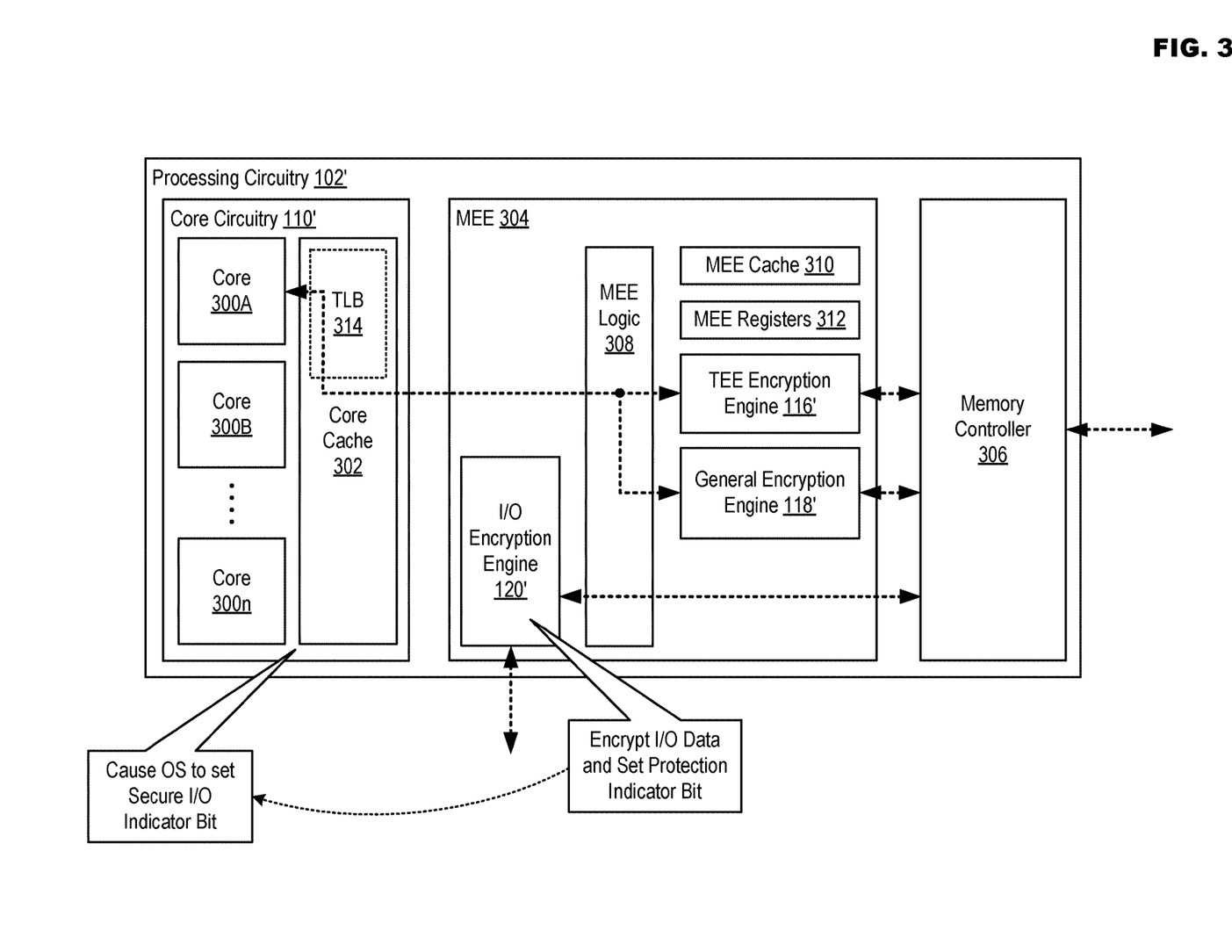
FIG. 3 illustrates an example configuration for processing circuitry comprising an I/O encryption engine in accordance with at least one embodiment of the present disclosure.

FIG. 3 illustrates an example configuration for processing circuitry comprising an I/O encryption engine in accordance with at least one embodiment of the present disclosure. FIG. 3 shows an example implementation utilizing a device 100' with SGX-enabled processing circuitry 102'. Processing circuitry 102' may comprise, for example, core circuitry 110' including at least one processing core 300 (e.g., core 300A, core 300B ... core 300n, collectively "cores 300A ... n") and core cache 302, MEE 304 (e.g., corresponding to encryption circuitry 112) and memory controller 306. Cores 300A ... n may perform various data processing operations using data from core cache 302. As referenced herein, a "cache" may comprise local volatile memory to hold data that may be utilized during a data processing operation. Core cache 302 may include a plurality of separate memory areas arranged in levels with the outermost level (e.g., from which data is transmitted to, and received from, MEE logic 308) being the last level cache (LLC). Core cache 302 may help to speed up data processing by avoiding having to repeatedly retrieve data that may be used more than once during a data processing operation from memory circuitry 104'. Memory controller 306 may control how processing circuitry 102' accesses memory circuitry 104' including, for example, how data may be read from memory circuitry 104 and written to memory circuitry 104.

In at least one embodiment, an OS-assisted approach may be employed to avoid double encryption/decryption of DMA data. For example, DMA memory allocated by device drivers for trusted I/O may be treated differently by the OS. More specifically, on a request for secure DMA memory, the OS may allocate memory from its free pool and mark the memory as secure DMA memory using a secure I/O indicator bit (e.g., "SEC_DMA" bit) in its page table. The page miss handler (PMH) may then load a page translation along with the SEC_DMA to the translation lookaside buffer (TLB). A memory access originating from the core is tagged with the SEC_DMA bit. A transaction tagged with this bit may serve as an indication to bypass general encryption engine 118'. For a core write, this would result in general encryption engine 118' skipping the encryption and for a core read, this would result in general encryption engine 118' skipping the decryption. Additionally, I/O encryption engine 120' may also include a protection indicator bit (e.g., "CE_PROT" bit) with the transactions that it protects again to serve as an indication for general encryption engine 118' to bypass encryption/decryption. Using this support, secure DMA data may be protected while avoiding duplication encryption/decryption. More specifically, a data line stored in memory circuitry 104 will be encrypted only once on a write and decrypted once on a read while maintaining the same security guarantee that all data lines in memory will be encrypted, thereby providing an efficient memory protection solution.

Figure 4:
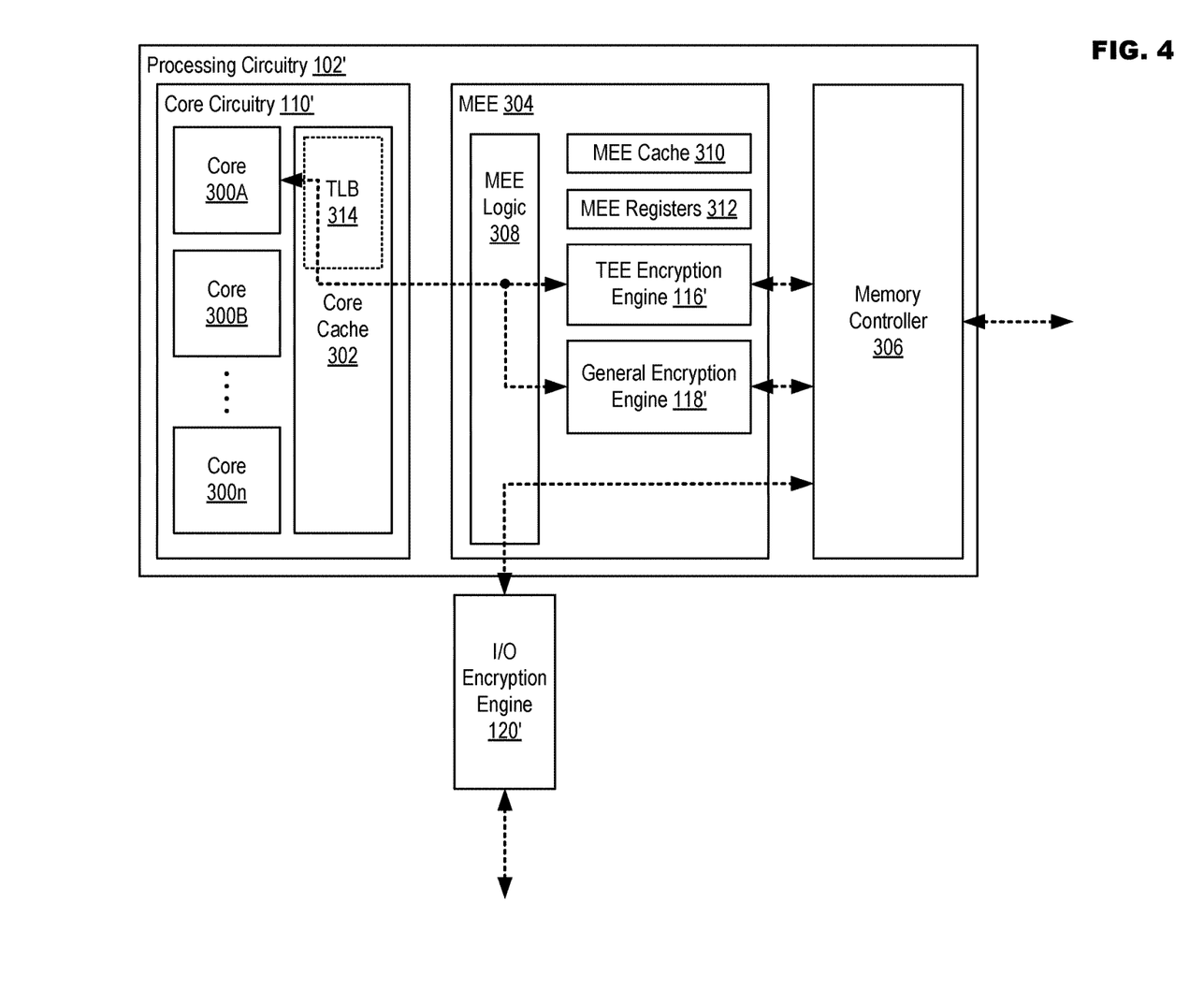
FIG. 4 illustrates an example configuration for processing circuitry that may interact with an I/O encryption engine in accordance with at least one embodiment of the present disclosure.

MEE 304 may include, for example, MEE logic 308, MEE cache 310 and MEE registers 312. MEE logic 308 may perform a variety of operations (e.g., data encryption, data decryption, key management, etc.) to cryptographically protect portions of memory circuitry 104'. MEE cache 310 may be to hold security metadata at least during the memory protection operations. TEE encryption engine 116', general encryption engine 118' and I/O encryption engine 120' are co-located in MEE 304 on the memory path. However, the organization illustrated in FIG. 3 is only for illustration purposes as the various crypto engines can be located elsewhere in device 100 (e.g., as shown in FIG. 4). FIG. 3 demonstrates a path that secure data may follow to/from an I/O device. The data may remain as plaintext until it is encrypted by I/O encryption engine 120'. I/O encryption engine 120' may utilize a key provisioned by trusted software (e.g., in TEE 122) to allow the software to recover the original I/O data.

Consistent with the present disclosure, an OS-assisted approach may be employed where drivers requesting DMA memory from the OS indicate if the memory is requested for trusted I/O or regular data. The OS on receiving a request for secure memory marks the memory as memory that will be secured by I/O encryption engine 120'. This may be accomplished by extending an entry in the page table used to map virtual addresses to physical addresses in memory circuitry 104. The secure I/O indicator bit (e.g., SEC_DMA) may be added to the page table entry. This bit along with the translation of the data stored at the memory location may be loaded to TLB 314. Memory accesses from core circuitry 110' may carry the SEC_DMA bit along with the transaction. For example, a request tag may be extended or re-purposed to carry the SEC_DMA bit, or a new bit may be introduced over the in-die interconnect (IDI) bus that connects cores 300A . . . n to the system agent. Other possible implementations of the SEC_DMA bit may exist, and are not strictly limited to the examples presented in this disclosure. Additionally, on an interface from I/O encryption engine 120' to memory controller 306, a protection indicator bit (e.g., CE_PROT) may be carried. The CE_PROT bit may indicate that the data line coming in (e.g., for input) or the request made (e.g., for output) is protected by I/O encryption engine 120' and the TEE encryption engine 116' and general encryption engine 118' downstream may bypass the request. For any input request completion, there may be two separate phases to be completed. In a first phase device input data is written to memory circuitry 104 using DMA. Once DMA is completed, an interrupt may be raised which is used by software to read the DMA data from memory and process it.

In at least one embodiment, the SEC_DMA bit may be set on an interface from the cores to the switch fabric (e.g., root complex 108) and also on a memory interface from the switch fabric to the memory controller. The CE_PROT bit may be carried from I/O encryption engine 120' to MEE logic 308 or to the switch fabric (e.g., in the instance that I/O encryption engine 120' is not converged within encryption circuitry 112' as shown in FIG. 4) and downstream to an interface with memory controller 306. Consistent with the present disclosure, I/O data may be encrypted by I/O encryption engine 120' and general encryption engine 118' may be bypassed. FIG. 3 only demonstrates a first phase of trusted input data. On a second phase (e.g., where the software reads data from memory), general encryption engine 118' may be similarly bypassed the software will decrypt it, removing a decryption iteration and avoiding redundant encryption. While FIG. 3 discloses various types of data being placed into memory, the various embodiments disclosed herein may also be used for output protection wherein, for example, data may be read from memory and then consumed by an output device. For example, a trusted application may load encrypted data from memory and decrypt the data just prior to delivery to the output device.

FIG. 4 illustrates an example configuration for processing circuitry that may interact with an I/O encryption engine in accordance with at least one embodiment of the present disclosure. FIG. 4 illustrates a possible configuration wherein I/O encryption engine 120' is not located in processing circuitry 102'. For example, I/O encryption engine 120' may be located anywhere along the memory path between I/O circuitry 106 and memory circuitry 104. The encryption of I/O data may be communicated between I/O encryption engine 120' and processing circuitry 102' through the setting of the protection indicator bit (e.g., CE_PROT). Moreover, in at least one embodiment TEE encryption engine 116' and/or general encryption engine 118' may also be located outside of processing circuitry 102' (e.g., in the same chipset or different chips/chipsets).

Figure 5:
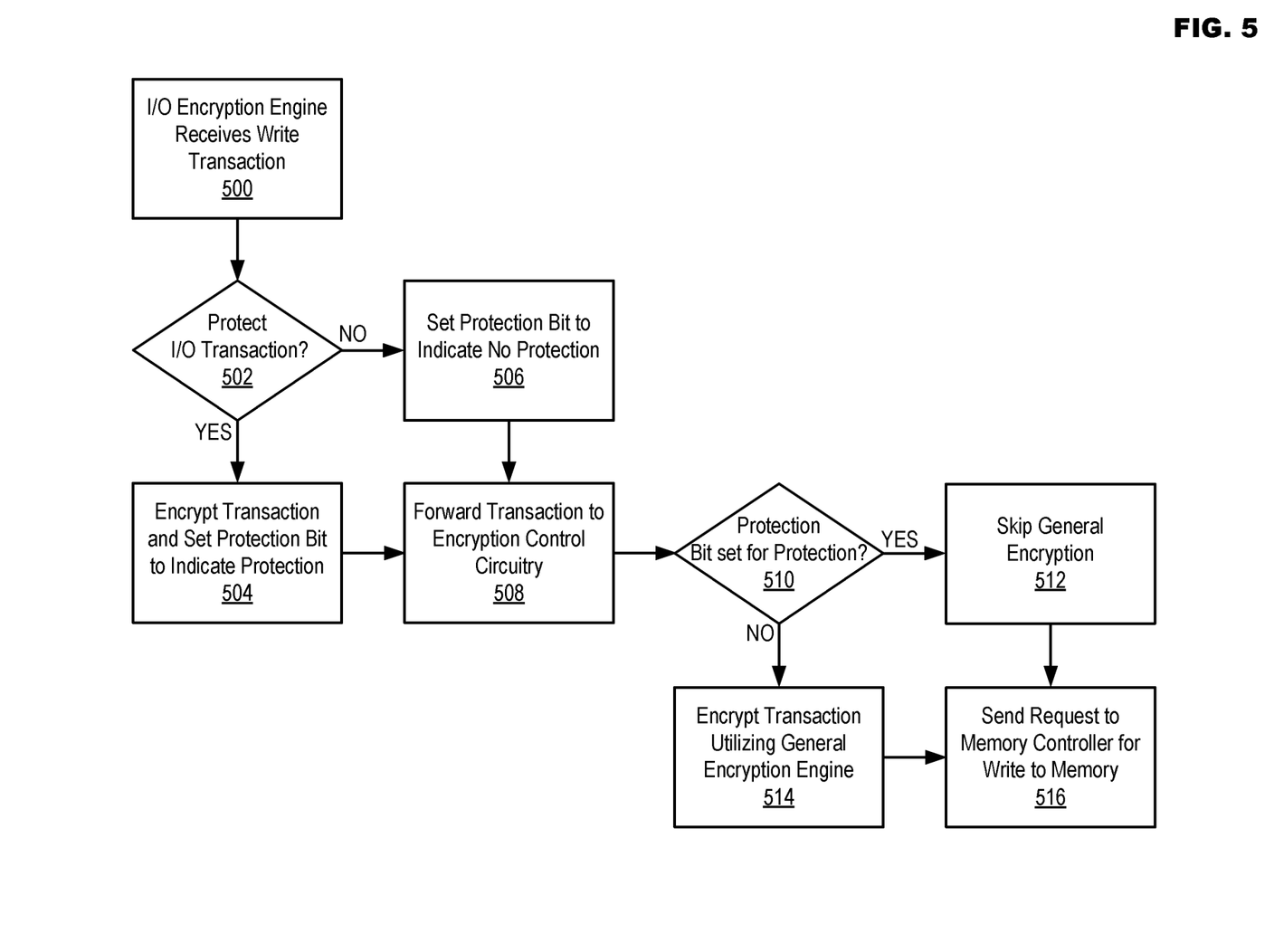
FIG. 5 illustrates example operations for handling a request to write to a data location in accordance with at least one embodiment of the present disclosure.

FIG. 5 illustrates example operations for handling a request to write to a data location in accordance with at least one embodiment of the present disclosure. Initially, an I/O encryption engine in a device may receive a write transaction in operation 500. A determination may then be made in operation 502 as to whether the I/O transaction is to be protected (e.g., whether I/O data in the transaction should be encrypted by the I/O encryption engine). In operation 504 the transaction may be encrypted and the protection indicator may be set (e.g., to "1"). If in operation 502 it is determined that the I/O transaction should not be protected, then in operation 506 the protection indicator bit may be set to indicate that the transaction is not protected (e.g., e.g., to "0" to indicate "no protection" for the I/O data). Following operations 504 or 506, in operation 508 the transaction may be forwarded to encryption control circuitry in processing circuitry in the device.

A determination may then be made in operation 510 as to whether the protection indicator bit is set. If in operation 510 it is determined that the protection indicator bit is set, then in operation 512 the encryption control circuitry may cause encryption by general encryption circuitry in the device to be skipped (e.g., since the I/O data was already encrypted by the I/O encryption circuitry). If in operation 510 it is determined that the protection indicator bit was set to indicate no protection, then in operation 514 the general encryption engine may encrypt the I/O data in the transaction. Following operations 512 or 514, in operation 516 the transaction request may be sent to a memory controller in the processing circuitry to write the data to memory.

Figure 6:
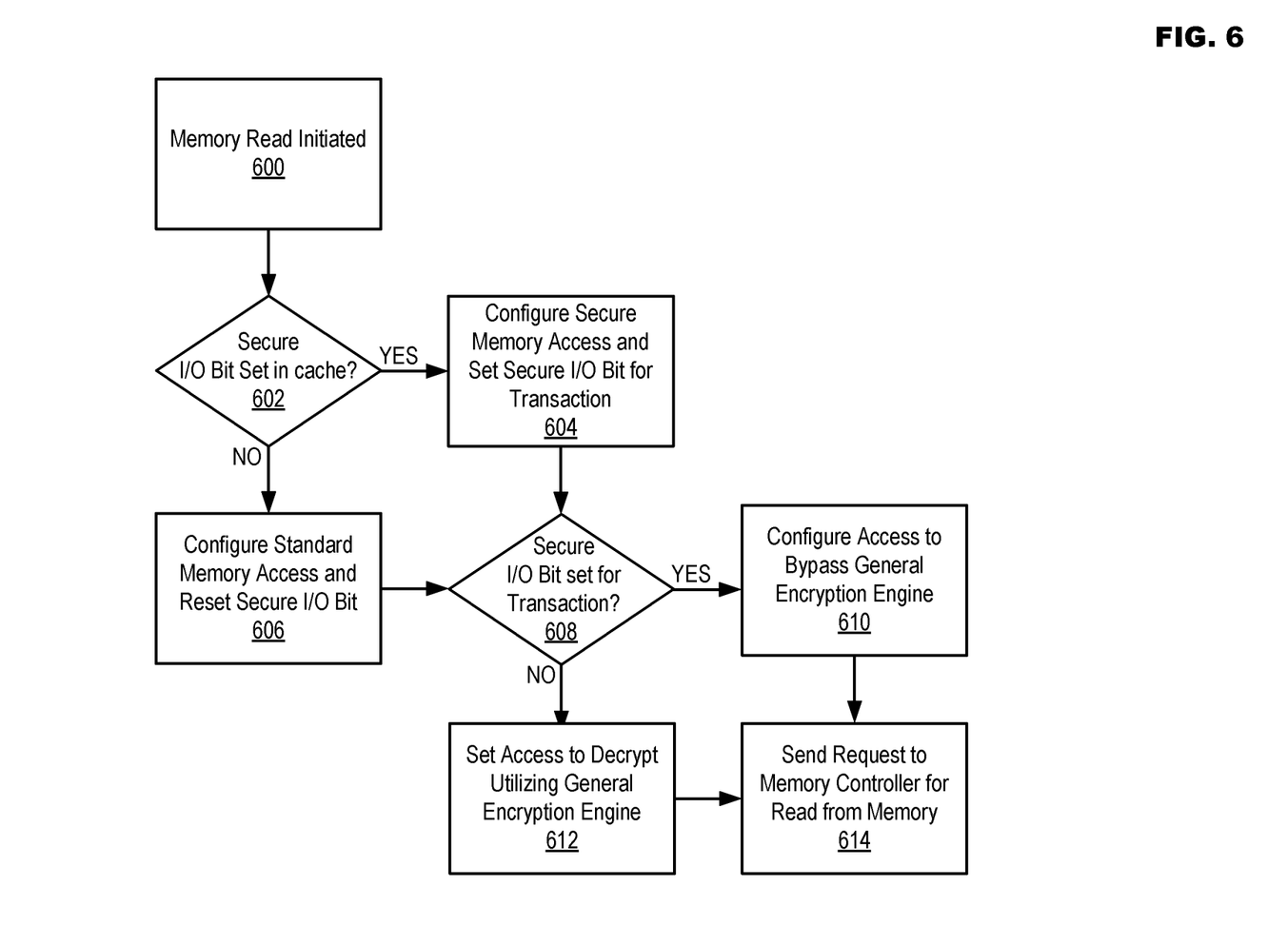
FIG. 6 illustrates example operations for handling a request to read from a data location in accordance with at least one embodiment of the present disclosure.

FIG. 6 illustrates example operations for handling a request to read from a data location in accordance with at least one embodiment of the present disclosure. A memory read may be initiated in operation 600. A determination may then be made as to whether a secure I/O indicator bit has been set in a cache (e.g., in a TLB) for processing circuitry in a device. The secure I/O indicator bit being set indicates that the data was originally encrypted prior to being stored using an I/O encryption engine. If in operation 602 it is determined that the secure I/O indicator bit is set, then in operation 604 secure access may be configured and the secure I/O indicator bit may also be set for the read transaction (e.g., set to "1"). Secure access may entail keeping the I/O data encrypted during retrieval from memory to ensure protection until received by a trusted application. As will be described below, the general encryption engine may be skipped. The trusted application may then decrypt the I/O data. If in operation 602 it is determined that the secure I/O indicator bit is not set (e.g., the data was not originally encrypted using the I/O encryption engine), then in operation 606 a standard memory access may be configured and the secure I/O indicator bit may be reset in the transaction (e.g., set to "0").

Following operation 604 or 606, a determination may then be made in operation 608 as to whether the secure I/O indicator bit is set for the transaction. If in operation 608 it is determined that the secure I/O indicator bit is set for the transaction, then in operation 610 access may be configured to skip decryption utilizing the general encryption engine. If in operation 608 it is determined that the secure I/O indicator bit is not set then in operation 612 access may be configured to utilize the general encryption engine to decrypt the data to be read. Following operations 610 or 612, in operation 614 the request transaction may be sent to the memory controller to proceed with the data read.

While FIGS. 5 and 6 illustrate operations according to different embodiments, it is to be understood that not all of the operations depicted in FIGS. 5 and 6 are necessary for other embodiments. Indeed, it is fully contemplated herein that in other embodiments of the present disclosure, the operations depicted in FIGS. 5 and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDI/O) cards, magnetic or optical cards, or any type of media suitable for storing electronic instructions. Other embodiments may be implemented as software executed by a programmable control device.

Thus, this disclosure is directed to avoiding redundant memory encryption in a cryptographic protection system. Data stored in a device may be protected using different encryption systems. Data associated with at least one trusted execution environment (TEE) may be encrypted using a first encryption system. Main memory in the device may comprise data important to maintaining the integrity of an operating system (OS), etc. and may be encrypted using a second encryption system. Data may also be placed into a memory location via direct memory access (DMA) and may be protected utilizing a third encryption system. Redundant encryption may be avoided by encryption circuitry capable of determining when data is already protected by encryption provided by another system. For example, the encryption circuitry may comprise encryption control circuitry that monitors indicators set at different points during data handling, and may bypass certain data encryption or decryption operations based on the indicator settings.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a cryptographic protection system avoiding redundant memory encryption.

According to example 1 there is provided a device equipped for cryptographic memory protection. The device may comprise memory circuitry to store data, the memory circuitry including a first region in which encrypted data associated with at least one trusted execution environment is stored, a second region in which encrypted data associated with general memory is stored and at least one memory location in which encrypted data received via direct memory access is stored and processing circuitry to process the data stored in the memory circuity, the processing circuitry including encryption circuitry to avoid redundant memory encryption by controlling at least one of a first encryption engine to perform data encryption and decryption for the first region or a second encryption engine to perform data encryption and decryption for the second region.

Example 2 may include the elements of example 1, wherein the processing circuitry is based on Secure Guard Extensions (SGX) technology and the encryption circuitry includes a memory encryption engine (MEE).

Example 3 may include the elements of any of examples 1 to 2, wherein the first region corresponds to a first fixed range of memory addresses and the second region corresponds to a second fixed range of memory addresses.

Example 4 may include the elements of any of examples 1 to 3, and may further comprise input/output (I/O) circuitry to receive or generate I/O data and store the I/O data in the memory circuitry via direct memory access.

Example 5 may include the elements of example 4, wherein the I/O circuitry is further to receive encrypted data from the memory circuitry via direct memory access.

Example 6 may include the elements of example 5, wherein the encrypted data is decrypted by a trusted application in the device prior to being received by the I/O circuitry.

Example 7 may include the elements of example 6, wherein the trusted application executes within the trusted execution environment.

Example 8 may include the elements of any of examples 1 to 7, further comprising a third encryption engine to perform at least data encryption for the at least one memory location.

Example 9 may include the elements of example 8, wherein the third encryption engine is an I/O encryption engine to provide trusted I/O in the device.

Example 10 may include the elements of any of examples 8 to 9, wherein the third encryption engine is to set a protection indicator bit indicating that data received via direct memory access has been encrypted.

Example 11 may include the elements of example 10, wherein the processing circuitry is to cause an operating system in the device to set a secure I/O indicator bit associated with the at least one memory location, the secure I/O indicator bit indicating that the at least one memory location is a secure memory location.

Example 12 may include the elements of example 11, wherein the processing circuitry comprises a translation lookaside buffer and the processing circuitry is to load a translation and the secure I/O indicator bit into the translation lookaside buffer.

Example 13 may include the elements of example 12, wherein the encryption circuitry comprises at least encryption control circuitry, the first encryption engine and the second encryption engine.

Example 14 may include the elements of example 13, wherein the encryption circuitry also comprises the third encryption engine.

Example 15 may include the elements of any of examples 13 to 14, wherein the encryption control circuitry is to control data encryption and decryption involving at least the second encryption engine based on a setting of at least one of the protection indicator bit and the secure I/O indicator bit.

According to example 16 there is provided a method for cryptographic memory protection. The method may comprise receiving an access request at processing circuitry in a device to access a memory location in memory circuitry in the device, the memory circuitry including a first region in which encrypted data associated with at least one trusted execution environment is stored, a second region in which encrypted data associated with general memory is stored and at least one memory location in which encrypted data received via direct memory access is stored, determining, in encryption circuitry within the processing circuitry, the setting of at least one indicator bit corresponding to the data or the memory location and avoiding redundant memory encryption by controlling, in the encryption circuitry, at least one of a first encryption engine in the encryption circuitry to perform data encryption and decryption for the first region or a second encryption engine to perform data encryption and decryption for the second region of the memory circuitry.

Example 17 may include the elements of example 16, wherein accessing a memory location comprises writing data to the memory location or reading data from the memory location.

Example 18 may include the elements of example 17, wherein writing data comprises receiving data from I/O circuitry in the device for storage in the memory location via direct memory access.

Example 19 may include the elements of any of examples 17 to 18, wherein reading data comprises providing data from the memory location to I/O circuitry in the device via direct memory access.

Example 20 may include the elements of any of examples 17 to 19, and may further comprise causing an operating system in the device to set a secure I/O indicator bit associated with the at least one memory location, the secure I/O indicator bit indicating that the at least one memory location is a secure memory location.

Example 21 may include the elements of any of examples 17 to 20, and may further comprise determining, when an access request comprising data to be written is received via direct memory access, if the data to be written is to be encrypted prior to being written and encrypting the data to be written utilizing a third encryption engine and setting a protection indicator bit associated with the data to be written based on a determination that the data to be written is to be encrypted prior to being written.

Example 22 may include the elements of example 21, and may further comprise determining if the protection indicator bit is set, controlling the second encryption engine to avoid encrypting the data to be written and based on a determination that the protection indicator bit is set, controlling the second encryption engine to encrypt the data to be written based on a determination that the protection indicator bit is not set and forwarding the access request to a memory controller in the processing circuitry.

Example 23 may include the elements of example 22, and may further comprise storing the data to be written in the memory location.

Example 24 may include the elements of any of examples 21 to 23, and may further comprise determining if the protection indicator bit is set, controlling the second encryption engine to avoid encrypting the data to be written and based on a determination that the protection indicator bit is set, controlling the second encryption engine to encrypt the data to be written based on a determination that the protection indicator bit is not set, forwarding the access request to a memory controller in the processing circuitry and storing the data to be written in the memory location.

Example 25 may include the elements of any of examples 17 to 24, and may further comprise determining, when a request to read data is received, if a secure I/O indicator bit associated with the memory location is set and setting the secure I/O indicator bit for a transaction corresponding to the request to read data based on a determination that the secure I/O indicator bit associated with the memory location is set.

Example 26 may include the elements of example 25, and may further comprise determining if the secure I/O indicator bit is set in the transaction, controlling the second encryption engine to avoid decrypting the data to be read based on a determination that the protection indicator bit is set in the transaction, controlling the second encryption engine to decrypt the data to be read based on a determination that the protection indicator bit is not set in the transaction and forwarding the access request to a memory controller in the processing circuitry.

According to example 27 there is provided a system including at least one device, the system being arranged to perform the method of any of the above examples 16 to 26.

According to example 28 there is provided a chipset arranged to perform the method of any of the above examples 16 to 26.

According to example 29 there is provided at least one machine readable medium comprising a plurality of instructions that, in response to be being executed on a computing device, cause the computing device to carry out the method according to any of the above examples 16 to 26.

According to example 30 there is provided at least one device equipped for cryptographic memory protection, the at least one device being arranged to perform the method of any of the above examples 16 to 26.

According to example 31 there is provided a system for cryptographic memory protection. The system may comprise means for receiving an access request at processing circuitry in a device to access a memory location in memory circuitry in the device, the memory circuitry including a first region in which encrypted data associated with at least one trusted execution environment is stored, a second region in which encrypted data associated with general memory is stored and at least one memory location in which encrypted data received via direct memory access is stored, means for determining, in encryption circuitry within the processing circuitry, the setting of at least one indicator bit corresponding to the data or the memory location and means for avoiding redundant memory encryption by controlling, in the encryption circuitry, at least one of a first encryption engine in the encryption circuitry to perform data encryption and decryption for the first region or a second encryption engine to perform data encryption and decryption for the second region of the memory circuitry.

Example 32 may include the elements of example 31, wherein the means for accessing a memory location comprise means for writing data to the memory location or reading data from the memory location.

Example 33 may include the elements of example 32, wherein the means for writing data comprise means for receiving data from I/O circuitry in the device for storage in the memory location via direct memory access.

Example 34 may include the elements of any of examples 32 to 33, wherein the means for reading data comprise means for providing data from the memory location to I/O circuitry in the device via direct memory access.

Example 35 may include the elements of any of examples 32 to 34, and may further comprise means for causing an operating system in the device to set a secure I/O indicator bit associated with the at least one memory location, the secure I/O indicator bit indicating that the at least one memory location is a secure memory location.

Example 36 may include the elements of any of examples 32 to 35, and may further comprise means for determining, when an access request comprising data to be written is received via direct memory access, if the data to be written is to be encrypted prior to being written and means for encrypting the data to be written utilizing a third encryption engine and set a protection indicator bit associated with the data to be written based on a determination that the data to be written is to be encrypted prior to being written.

Example 37 may include the elements of example 36, and may further comprise means for determining if the protection indicator bit is set, means for controlling the second encryption engine to avoid encrypting the data to be written based on a determination that the protection indicator bit is set, means for controlling the second encryption engine to encrypt the data to be written based on a determination that the protection indicator bit is not set and means for forwarding the access request to a memory controller in the processing circuitry.

Example 38 may include the elements of example 37, and may further comprise means for storing the data to be written in the memory location.

Example 39 may include the elements of any of examples 36 to 38, and may further comprise means for determining if the protection indicator bit is set, means for controlling the second encryption engine to avoid encrypting the data to be written and based on a determination that the protection indicator bit is set, means for controlling the second encryption engine to encrypt the data to be written based on a determination that the protection indicator bit is not set, means for forwarding the access request to a memory controller in the processing circuitry and means for storing the data to be written in the memory location.

Example 40 may include the elements of any of examples 32 to 39, and may further comprise means for determining, when a request to read data is received, if a secure I/O indicator bit associated with the memory location is set and means for setting the secure I/O indicator bit for a transaction corresponding to the request to read data based on a determination that the secure I/O indicator bit associated with the memory location is set.

Example 41 may include the elements of example 40, and may further comprise means for determining if the secure I/O indicator bit is set in the transaction, means for controlling the second encryption engine to avoid decrypting the data to be read based on a determination that the protection indicator bit is set in the transaction, means for controlling the second encryption engine to decrypt the data to be read based on a determination that the protection indicator bit is not set in the transaction and means for forwarding the access request to a memory controller in the processing circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device equipped for cryptographic memory protection, comprising:
    memory circuitry to store data, the memory circuitry including a first region in which encrypted data associated with at least one trusted execution environment is stored, a second region in which encrypted data associated with general memory is stored and at least one memory location in which encrypted data received via direct memory access is stored; and
    processing circuitry that includes translation lookaside buffer circuitry to:
    process the data stored in the memory circuitry;
    load a translation and a secure I/O indicator bit into the translation lookaside buffer;
    wherein the processing circuitry includes encryption circuitry to avoid redundant memory encryption by controlling at least one of:
    a first encryption engine to perform data encryption and decryption for the first region; or
    a second encryption engine to perform data encryption and decryption for the second region;
    determine when an access request comprising data to be written is received via direct memory access, if the data to be written is to be encrypted prior to being written; and
    responsive to a determination that the data to be written is to be encrypted prior to being written:

encrypt the data to be written utilizing a third encryption engine; and set a protection indicator bit associated with the encrypted data.

2. The device of claim 1, wherein the processing circuitry is based on Secure Guard Extensions (SGX) technology and the encryption circuitry includes a memory encryption engine (MEE).

3. The device of claim 1, wherein the first region corresponds to a first fixed range of memory addresses and the second region corresponds to a second fixed range of memory addresses.

4. The device of claim 1, further comprising input/output (I/O) circuitry to receive or generate I/O data and store the I/O data in the memory circuitry via direct memory access.

5. The device of claim 1, further comprising the third encryption engine to perform at least the data encryption for the at least one memory location.

6. The device of claim 5, wherein the third encryption engine is to set the protection indicator bit indicating that the data received via direct memory access has been encrypted.

7. The device of claim 6, wherein the processing circuitry is to cause an operating system in the device to set the secure I/O indicator bit associated with the at least one memory location, the secure I/O indicator bit indicating that the at least one memory location is a secure memory location.

8. The device of claim 7, wherein the encryption circuitry comprises at least encryption control circuitry, the first encryption engine and the second encryption engine.

9. The device of claim 8, wherein the encryption circuitry also comprises the third encryption engine.

10. The device of claim 8, wherein the encryption control circuitry is to control data encryption and decryption involving at least the second encryption engine based on a setting of at least one of the protection indicator bit and the secure I/O indicator bit.

11. A method for cryptographic memory protection, comprising:

receiving an access request at processing circuitry in a device to access a memory location in memory circuitry in the device, the memory circuitry including a first region in which encrypted data associated with at least one trusted execution environment is stored, a second region in which encrypted data associated with general memory is stored and at least one memory location in which encrypted data received via direct memory access is stored;

loading, by the processing circuitry, a translation and the secure I/O indicator bit into a translation lookaside buffer communicatively coupled to the processing circuitry;

determining, in encryption circuitry within the processing circuitry, the setting of at least one indicator bit corresponding to the data or the memory location;

avoiding redundant memory encryption by controlling, in the encryption circuitry, at least one of a first encryption engine in the encryption circuitry to perform data encryption and decryption for the first region or a second encryption engine to perform data encryption and decryption for the second region of the memory circuitry;

determining, when an access request comprising data to be written is received via direct memory access, if the data to be written is to be encrypted prior to being written;

encrypting the data to be written utilizing a third encryption engine; and setting a protection indicator bit associated with the data to be written based on a determination that the data to be written is to be encrypted prior to being written.

12. The method of claim 11, wherein accessing a memory location comprises writing data to the memory location or reading data from the memory location.

13. The method of claim 11, further comprising:
determining if the protection indicator bit is set;
controlling the second encryption engine to avoid encrypting the data to be written and based on a determination that the protection indicator bit is set;
controlling the second encryption engine to encrypt the data to be written based on a determination that the protection indicator bit is not set; and
forwarding the access request to a memory controller in the processing circuitry.

14. The method of claim 13, further comprising:
storing the data to be written in the memory location.

15. The method of claim 11, further comprising:
determining, when a request to read data is received, if a secure I/O indicator bit associated with the memory location is set; and
setting the secure I/O indicator bit for a transaction corresponding to the request to read data based on a determination that the secure I/O indicator bit associated with the memory location is set.

16. The method of claim 15, further comprising:
determining if the secure I/O indicator bit is set in the transaction;
controlling the second encryption engine to avoid decrypting the data to be read based on a determination that the protection indicator bit is set in the transaction;
controlling the second encryption engine to decrypt the data to be read based on a determination that the protection indicator bit is not set in the transaction; and
forwarding the access request to a memory controller in the processing circuitry.

17. A non-transitory, machine-readable storage medium having stored thereon, individually or in combination, instructions for cryptographic memory protection that, when executed by one or more processors, cause the one or more processors to:

receive an access request at processing circuitry in a device to access a memory location in memory circuitry in the device, the memory circuitry including a first region in which encrypted data associated with at least one trusted execution environment is stored, a second region in which encrypted data associated with general memory is stored and at least one memory location in which encrypted data received via direct memory access is stored;

load a translation and the secure I/O indicator bit into a translation lookaside buffer communicatively coupled to the processing circuitry;

determine, in encryption circuitry within the processing circuitry, the setting of at least one indicator bit corresponding to the data or the memory location; and avoid redundant memory encryption by controlling, in the encryption circuitry, at least one of a first encryption engine in the encryption circuitry to perform data encryption and decryption for the first region or a second encryption engine to perform data encryption and decryption for the second region of the memory circuitry;

determine when an access request comprising data to be written is received via direct memory access, if the data to be written is to be encrypted prior to being written;

encrypt the data to be written utilizing a third encryption engine; and setting a protection indicator bit associated with the data to be written based on a determination that the data to be written is to be encrypted prior to being written.

18. The non-transitory storage medium of claim 17, wherein the instructions to access a memory location comprise instructions to write data to the memory location or read data from the memory location.

19. The non-transitory storage medium of claim 17, further comprising instructions that, when executed by one or more processors, cause the one or more processors to:
   determine if the protection indicator bit is set;
   control the second encryption engine to avoid encrypting the data to be written based on a determination that the protection indicator bit is set;
   control the second encryption engine to encrypt the data to be written based on a determination that the protection indicator bit is not set; and
   forward the access request to a memory controller in the processing circuitry.

20. The non-transitory storage medium of claim 19, further comprising instructions that, when executed by one or more processors, cause the one or more processors to:
   store the data to be written in the memory location.

21. The non-transitory storage medium of claim 18, further comprising instructions that, when executed by one or more processors, cause the one or more processors to:
   determine, when a request to read data is received, if a secure I/O indicator bit associated with the memory location is set; and
   set the secure I/O indicator bit for a transaction corresponding to the request to read data based on a determination that the secure I/O indicator bit associated with the memory location is set.

22. The non-transitory storage medium of claim 21, further comprising instructions that, when executed by one or more processors, cause the one or more processors to:
   determine if the secure I/O indicator bit is set in the transaction;
   control the second encryption engine to avoid decrypting the data to be read based on a determination that the protection indicator bit is set in the transaction;
   control the second encryption engine to decrypt the data to be read based on a determination that the protection indicator bit is not set in the transaction; and
   forward the access request to a memory controller in the processing circuitry.

\* \* \* \* \*